United States Patent [19]

Botsch

[11] Patent Number: 4,902,410
[45] Date of Patent: Feb. 20, 1990

[54] INTERCEPTOR FOR THE CONTINUOUS REMOVAL OF SOLID MATTER FROM A MIXTURE OF SOLIDS AND LIQUID

[75] Inventor: Bertram Botsch, Karlsruhe, Fed. Rep. of Germany

[73] Assignee: Maschinenfabrik Hellmut Geiger GmbH. & Co. KG, Karlsruhe, Fed. Rep. of Germany

[21] Appl. No.: 190,817

[22] Filed: May 6, 1988

[30] Foreign Application Priority Data

May 6, 1987 [DE] Fed. Rep. of Germany ....... 3715022

[51] Int. Cl.$^4$ ...................... B01D 21/34; B01D 33/06; B01D 33/36
[52] U.S. Cl. .................................. 210/104; 210/110; 210/248; 210/396; 210/402
[58] Field of Search ............... 210/104, 107, 110, 134, 210/135, 248, 396, 397, 402, 456, 86, 247; 162/321, 327, 330; 137/236.1

[56] References Cited

U.S. PATENT DOCUMENTS

| | | | |
|---|---|---|---|
| 2,534,760 | 12/1950 | Ellila | 210/402 |
| 2,685,235 | 8/1954 | Lindblad | 210/402 |
| 2,805,773 | 9/1957 | Mecklin et al. | 210/104 |
| 3,000,507 | 9/1961 | Young | 210/402 |
| 3,190,792 | 6/1965 | Beachler et al. | 162/327 |
| 3,522,883 | 8/1970 | Steckhan | 210/402 |
| 3,876,548 | 4/1975 | Welles, Jr. | 210/402 |
| 4,045,853 | 9/1977 | White | 210/402 |
| 4,049,549 | 9/1977 | Moore | 210/86 |
| 4,192,749 | 3/1980 | Jackson | 210/107 |
| 4,770,772 | 9/1988 | Kuwajima et al. | 210/402 |
| 4,781,835 | 11/1988 | Bahr et al. | 210/402 |
| 4,810,130 | 3/1989 | Brombach et al. | 137/236.1 |
| 4,836,917 | 6/1989 | Tomita et al. | 210/104 |

FOREIGN PATENT DOCUMENTS 489914 1/1953 Canada .
2219655 3/1973 Fed. Rep. of Germany ...... 210/402

Primary Examiner—Richard V. Fisher
Assistant Examiner—Joseph Drodge
Attorney, Agent, or Firm—Wenderoth, Lind & Ponack

[57] ABSTRACT

An interceptor for the continuous removal of solid matter from a mixture of solids and liquids includes a screening drum rotating while in operation in a given direction of rotation. The mixture is fed to the outer surface of the jacket of the drum, whereby the liquid enters the drum and solid matter remains on the outer surface of the drum jacket. A solids discharge device is provided adjacent the outer surface of the drum to remove deposited solid matter. At least the lower half of the screening drum is surrounded by a tank to which a mixture inlet is connected. A liquid outlet is connected to the interior of the screening drum. The level of the mixture in the tank is controlled in such a way that it is above the level of the cleansed liquid inside the screening drum. The mixture introduced into a flow chamber surrounding the drum jacket flows substantially in the same direction as the direction of rotation of the drum.

7 Claims, 2 Drawing Sheets

INTERCEPTOR FOR THE CONTINUOUS REMOVAL OF SOLID MATTER FROM A MIXTURE OF SOLIDS AND LIQUID

BACKGROUND OF THE INVENTION

The invention relates to an interceptor for the continuous removal of solid matter from a mixture of solids and liquid, the interceptor including a screening drum rotating in a given direction while operating, a jacket of the drum having screening openings, such as sieve openings. An inlet feeds the mixture to the outer surface of the drum jacket, whereby the liquid enters the drum through the openings in the jacket, and the solid matter remains on the outer surface of the drum jacket. The solid matter is removed from the outer surface of the drum jacket through a solids discharge, and a liquid outlet discharges the cleansed liquid.

Various types of interceptors in the form of screening drums are used. Generally, the mixture of solids and liquid is fed to the interior of the screening drum, the screened particles remaining inside the drum and the cleansed liquid emerging to the outside of the drum. For many purposes, this type of screening drum operates satisfactorily, but the discharge especially of all of the granular particles from the interior of the drum presents problems.

German Pat. No. 25 01 547 teaches an interceptor of the screening drum-type wherein the mixture is fed to the exterior of a drum. For this purpose, a box-type feeding mechanism is fitted to the drum jacket above the central plane of the drum. The liquid drops from there in a free fall through the interior of the drum and re-emerges through the openings in the jacket to the outside of the drum in the bottommost part of the drum jacket. The screened particles are carried away on the surface of the drum jacket and over the top of the drum and are removed by means of a plate reaching almost as far as the drum jacket.

Even though this known device simplifies the discharge of the removed solids, the throughput performance leaves much to be desired. Moreover, due to the great depth of fall of the liquid, the hydraulic losses are rather substantial.

SUMMARY OF THE INVENTION

Therefore, the object of this invention is to provide a screening drum-type interceptor, which makes possible a simple solids discharge, yet permits at the same time a high throughput performance in relation to the size of the device.

According to the invention, this object is achieved by surrounding at least the lower half of the screening drum by a tank connected to a mixture inlet. A liquid outlet is connected to the interior of the screening drum. The level of the mixture in the tank is controlled during operation in such a way that it is higher than the level of the cleansed liquid inside the screening drum. The mixture inlet extends into a flow chamber surrounding the screening drum in such a way that the mixture on the outer surface of the drum jacket flows substantially in the same direction of rotation as the screening drum.

The interceptor embodying the invention is distinguished by a substantially improved performance in relation to its size, as well as a simple structure and low hydraulic losses.

The operating characteristics can be controlled within wide limits, whereby especially the level of the mixture on the outer surface of the drum and the level of the cleansed liquid therewithin play an important role. The greater is the portion of the drum jacket immersed into the mixture, the larger will be the effective surface available for screening, and thereby the larger will be the throughput. Therefore, the mixture level preferably can be controlled in such a way that in normal operation at least one-half of the screening drum rotates within the mixture. Immersed screening surfaces between about 60% and 80% have been found to be especially successful.

The pressure difference between the outer and inner surfaces of the screening drum is essentially determined by the difference between the outer mixture level and the inner liquid level. In contrast to German Pat. No. 25 01 547, relatively small level differences have been found to be quite advantageous, not only in terms of hydraulic losses, but also with respect to intercepting or screening characteristics. Preferably, these level differences are controlled in such a way that they differ by less than three-quarters, preferably by less than one-half, of the drum diameter. In many cases, very small level differences amounting to less than 20 cm, often less than 10 cm, are especially advantageous.

The operation of the device according to the invention depends essentially on whether the particles to be screened are reliably deposited on the outer surface of the drum jacket, although this occurs predominantly in areas of the drum jacket within which the drum surface is oriented essentially downwards. To ensure deposition, it is important that the mixture on the outer surface of the screening drum flow essentially in the same direction as the direction of rotation of the drum. How strictly this condition is to be satisfied depends on each individual case, in particular on the characteristics of the solids to be removed.

In order to obtain a flow substantially in the same direction as the direction of rotation of the screening drum, the inlet is constructed in such a fashion that the effective orifice of at least one portion of the inflowing mixture is positioned adjacent the area or line at which the drum jacket becomes immersed in the mixture, i.e. the drum jacket moves into the mixture.

BRIEF DESCRIPTION OF THE DRAWINGS

Embodiments of the invention now will be discussed with reference to the accompanying drawings, in which.

DETAILED DESCRIPTION OF THE INVENTION

Figure 1:
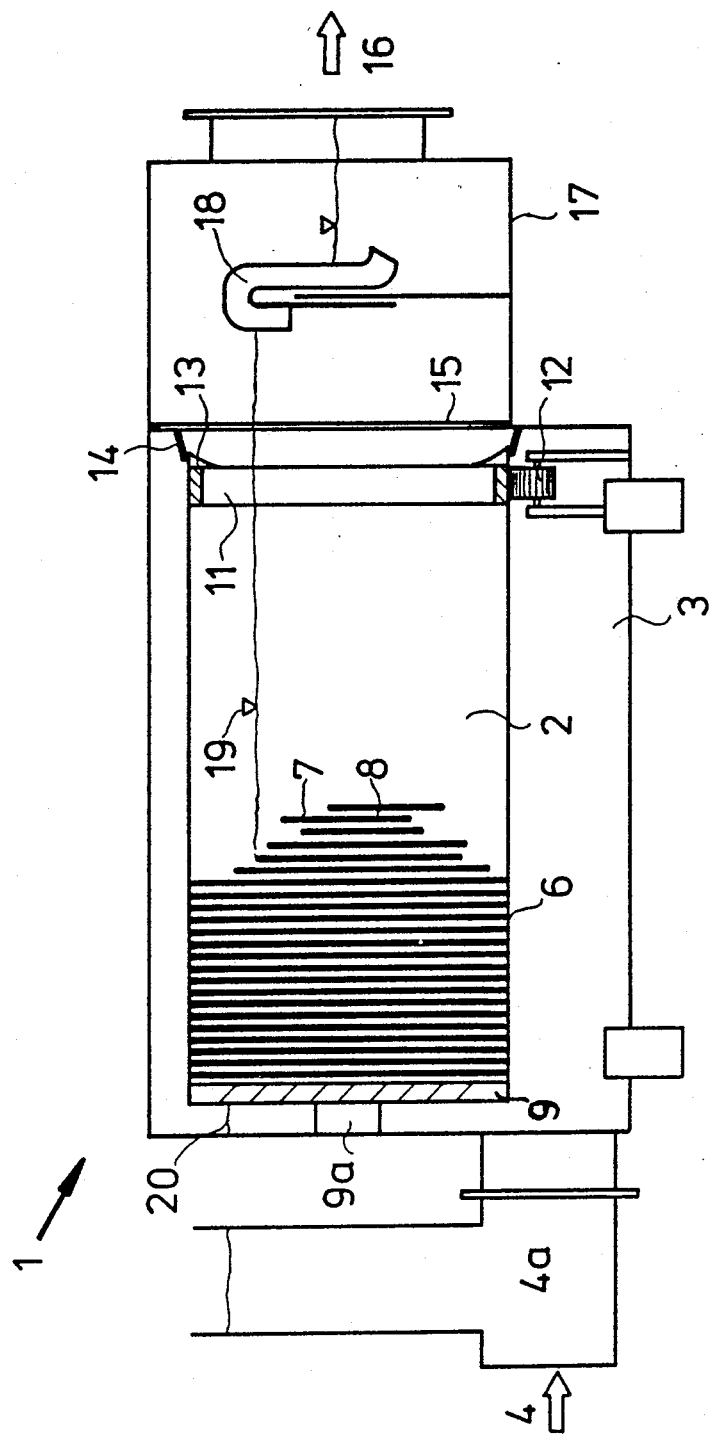
FIG. 1 is a schematic longitudinal sectional view of an interceptor according to the invention.
Figure 2:
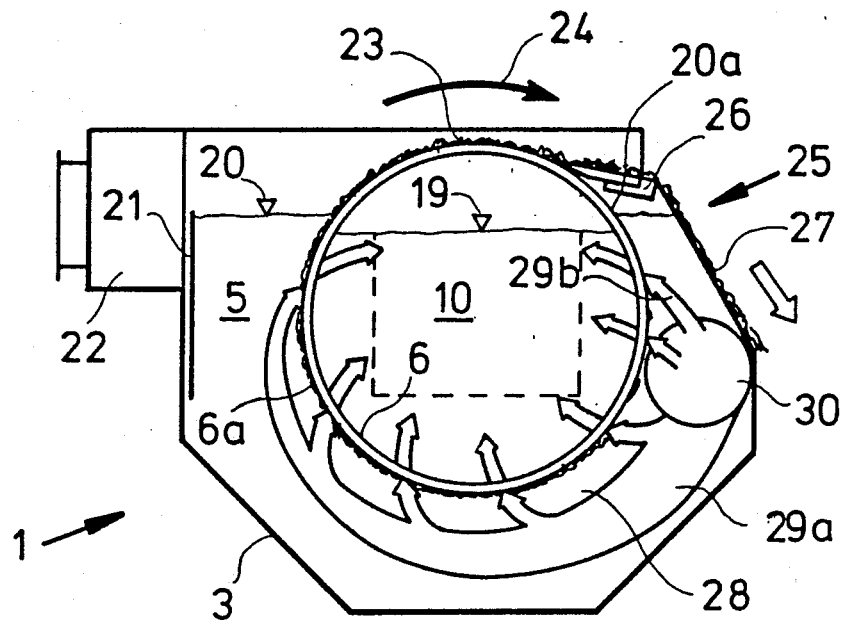
FIG. 2 is a transverse cross section of the interceptor shown in FIG. 1.

The interceptor 1 shown in FIGS. 1 and 2 has a screening drum 2 positioned within and surrounded by a tank 3. Tank 3 is closed at the bottom, so that it can be loaded with a mixture 5 of solids and liquid fed through inlet branch 4a of an inlet generally designated 4.

Screening drum 2 is substantially cylindrical and rotates about a horizontal axis. In the preferred construction shown, a jacket 6 of the drum is formed by rods 7 that form a screen and that have cross sections tapering conically toward the interior of the drum. Between rods 7 are clearances 8 through which the liquid can enter the interior of the drum. For the sake of clarify, only some of the rods 7 and clearances 8 are shown in FIG. 1. Instead of this preferred embodiment, other shapes of the drum jacket may be used, for example, a jacket having therein circular orifices.

In FIG. 1, the left end face of screening drum 2 is closed by a sealing disk 9 mounted on a bearing 9a. The screening drum is open on the right side through an outlet 10 for the cleansed liquid. Outlet 10 is surrounded and defined by a ring support 11 which runs on a roller bearing 12 and to which the jacket, i.e. rods 7, is attached. Located on ring support 11 is a joint or seal member 13 that is engaged by a circular rubber gasket 14 non-rotatably fastened to front cover 15 of tank 3. In order to avoid centering problems, packing or gasket 14 can, for example, be mounted with a radially sliding spoke wheel, not shown. Both sides of the drum also can be designed in this manner, so that the drum is open at both ends to discharge the cleansed liquid.

The outlet for the cleansed liquid, generally designated 16, has a weir box 17 provided with an adjustable weir 18 with which the level 19 of the cleansed liquid inside the screening drum 2 can be controlled. In the preferred embodiment shown in FIG. 1, a siphon weir is used. In this type of weir, the dependency of the liquid level on the quantity of overflowing water is relatively small, and thus, this type of weir is first and foremost of advantage for installations with large throughputs.

In order to be able to reliably limit the level 20 of the mixture 5 of solids and liquid in tank 3 to a maximum, there is provided a safety-overflow weir 21 with an outlet trough 22 to ensure that in operation the level 20 will never reach or exceed top 23 of screening drum 2. This weir 21 also may be designed as a siphon weir.

While in operation, screening drum 2 rotates in the direction indicated by arrow 24 in FIG. 2. The line or area of the drum entering into the mixture and becoming immersed below liquid level 20 is denoted 20a. While the liquid components of mixture 5 pass into the interior of screening drum 2, the solid matter remains predominantly on the outer surface of drum jacket 6. The cleansed liquid is discharged through outlet 10 in the open end face of screening drum 2 and outlet 16 via weir 18.

Solid matter 6a deposited on the exterior of drum jacket 6 is entrained by the rotating drum and transported therewith to an upper solids discharge, generally designated 25 and installed a short distance beyond the topmost portion 23 of the screening drum, relative to the direction of rotation of the drum.

Solids discharge 25 consists essentially of a springloaded stripper 26 abutting on the outer surface of the drum jacket and a chute 27 connected thereto, which may be covered with a lubricant in order to facilitate the removal of the solid matter. Preferably, the wall of tank 3 in the region of solids discharge 25 is oblique and extends to a position adjacent the drum, so that it can serve as a base for chute 27.

The pressure difference between a flow chamber or area 28 on the outer surface of drum 2 and the interior of drum 2 is determined by the difference between level 20 of mixture 5 and level 19 of cleansed liquid 10. Both levels can be controlled in different ways. Thus, for example, there may be provided a control that determines the actual values involved and, in order to correct them, controls the quantity of mixture 5 supplied, the quantity of cleansed liquid discharged and, if necessary, the rotational speed of screening drum 2. With a very simple and at the same time reliably operating construction of the level control, the level 19 of cleansed liquid 10 is predetermined by adjustment of the weir 18. Level 20 of mixture 5 can be set by controlling the inflow of the mixture, e.g. by control of feeding pumps or by appropriate gate valves. As mentioned above, overflow weir 21 ensures that level 20 will not exceed the highest permissible level.

As mentioned above, it is important that mixture 5 in flow chamber 28 flow substantially in the same direction of rotation 24 as screening drum 2. This flow starts from an orifice 30 of inlet 4. In the interest of clarity, the connection between inlet 4 and orifice 30 is not shown in the drawings. However, this connection obviously can be established in different ways, for example, by means of lines extending within or outside tank 3 or by baffle plates mounted therein.

In FIG. 2, the flow starting from orifice 30 is indicated by arrows 29a and 29b. The widths of the arrows correspond approximately to the amounts of liquid flowing in the regions involved. The flow in flow chamber 28 is effected considerably by the site or location to which the mixture is introduced. Orifice 30 is placed near the line or area 20a whereat the jacket 6 enters and becomes immersed below the liquid level 20 of the mixture. This ensures that a substantial portion of the current of the introduced mixture flows in the desired direction of rotation, and only a small portion indicated by arrows 29b flows in the opposite direction. The size of this portion depends on each individual case. In order to ensure the efficient operation of the interceptor, it is desirable that at least 50%, preferably at least 80%, of the introduced mixture flows in the direction of rotation 24 of screening drum 2.

Figure 3:
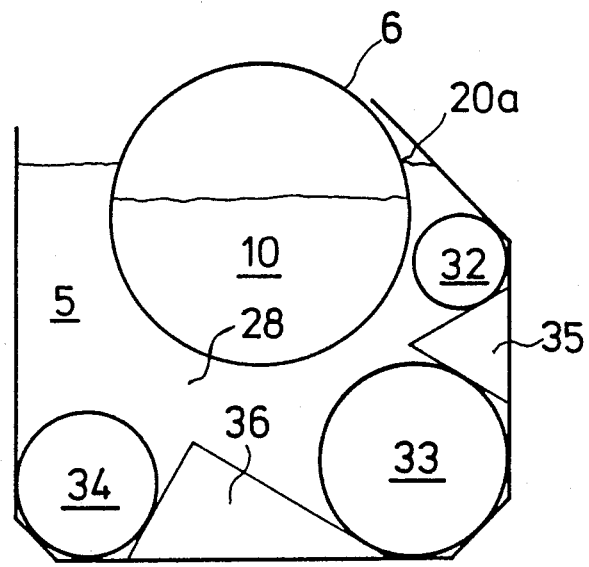
FIG. 3 is a schematic diagram in cross section of an interceptor for high throughputs.

FIG. 3 is a schematic diagram of the interceptor, in which inlet 4 for the mixture is provided with several orifices 32, 33, 34. Such a design is appropriate if large amounts of the mixture are to be supplied. In that case, not all of the orifices lie in the vicinity of immersion area 20a of drum 2 into the mixture. Instead, it is sufficient that one of the orifices (orifice 32, in the case shown) satisfy this condition and that the other orifices 33, 34 be distributed around the drum in such a way as to obtain a satisfactorily uniform flow. With especially large throughput capacities, orifices 33 and 34 may overlap partially or completely.

To prevent the formation of deposits in tank 3, the invention provides for an appropriate dimensioning of the hydraulic cross section in flow chamber 28. Wall projections 35 and 36 are provided in the tank depicted in FIG. 3 and operate to selectively constrict the hydraulic cross section and provide for an adequate flow rate of the mixture to prevent such deposits.

I claim:

1. An interceptor apparatus for the continuous removal of solid matter containing granular particles from a mixture of solids and liquid, said apparatus comprising:
   a screening drum including a drum jacket;
   means for rotating said drum in a given direction of rotation;
   a tank to receive a mixture of solids and liquid, said tank surrounding at least the lower half of said drum and defining therewith a flow chamber for the mixture;

inlet means connected to said tank for introducing the mixture into said tank such that the mixture flows along the outer surface of said drum jacket substantially in the same direction as said given direction of rotation of said drum and such that the mixture fills said tank outwardly of said drum to an upper mixture level, said inlet means including an orifice opening into said tank at a location below the mixture level and adjacent a line of immersion of said drum into the mixture as said drum rotates, whereby the liquid from the mixture is cleansed by passing through said drum jacket to the interior of said drum and the solid matter is retained on said outer surface of said drum jacket;

solid matter discharge means for removing the retained solid matter from said outer surface of said drum jacket, said solid matter discharge means being located at a position downstream of the topmost portion of said drum, with respect to the direction of rotation thereof, said solid matter discharge means comprising a stripper abutting said outer surface of said drum jacket;

outlet means for removing the cleansed liquid from said interior of said drum; and mixture level control means for controlling the mixture level in said tank and liquid level control means for controlling the level of the cleansed liquid within said interior of said drum such that the mixture level is higher than the cleansed liquid level, such that at least one half of said drum is immersed in the mixture, and such that the difference between the mixture level and the cleansed liquid level is less than half the diameter of said drum.

2. An apparatus as claimed in claim 1, wherein said mixture level control means and said cleansed liquid level control means control the respective levels thereof such that the level difference therebetween is less than, 20 cm.

3. An apparatus as claimed in claim 1, wherein said mixture level control means and said cleansed liquid level control means control the respective levels thereof such that the level difference therebetween is less than 10 cm.

4. An apparatus as claimed in claim 1, wherein said cleansed liquid control means comprises a siphon weir.

5. An apparatus as claimed in claim 1 wherein said mixture level control means comprises means for controlling the inflow rate of the mixture and a siphon weir for limiting the maximum level of the mixture.

6. An apparatus as claimed in claim 1, wherein said inlet means comprises a plurality of orifices opening into said tank.

7. An apparatus as claimed in claim 1, wherein said flow chamber has a hydraulic cross section dimensioned to prevent the formation of deposits of the solid matter on the bottom of said tank.

* * * * *